United States Patent
Abulkhair et al.

(10) Patent No.: US 11,912,588 B1
(45) Date of Patent: Feb. 27, 2024

(54) GAS HYDRATE DESALINATION SYSTEM

(71) Applicant: King Abdulaziz University, Jeddah (SA)

(72) Inventors: Hani Abulkhair, Jeddah (SA); Iqbal Rajput, Jeddah (SA); Omar Ahmed Bamaga, Jeddah (SA); Eydhah Almatrafi, Jeddah (SA); Abdulmohsen Omar Alsaiari, Jeddah (SA); Muhammad Albeirutty, Jeddah (SA); Muhammad Khan, Perak (MY); Bhajan Lal, Perak (MY); Hussam Organgi, Jeddah (SA); Amer Shaiban, Makkah (SA); Azmi Sharif, Perak (MY); Sirisha Nallakukkala, Perak (MY)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 18/320,376

(22) Filed: May 19, 2023

(51) Int. Cl.
| | | |
|---|---|---|
| *C02F 1/22* | (2023.01) | |
| *C02F 1/00* | (2023.01) | |
| *C02F 103/08* | (2006.01) | |

(52) U.S. Cl.
CPC ............... *C02F 1/22* (2013.01); *C02F 1/004* (2013.01); *C02F 2103/08* (2013.01);
(Continued)

(58) Field of Classification Search
CPC .......... C02F 1/22; C02F 1/265; C02F 1/4604; C02F 2103/08
See application file for complete search history.

(56) References Cited

U.S. PATENT DOCUMENTS

| | | | |
|---|---|---|---|
| 2014/0158635 A1* | 6/2014 | Katyal | C02F 1/5209 62/340 |
| 2017/0008778 A1* | 1/2017 | Aly | B01D 9/04 |
| 2022/0002162 A1 | 1/2022 | Kar et al. | |

FOREIGN PATENT DOCUMENTS

| | | |
|---|---|---|
| CN | 208554097 U | 3/2019 |
| CN | 210815199 U | 6/2020 |

(Continued)

OTHER PUBLICATIONS

Cai et al.; Raman spectroscopic studies on carbon dioxide separation from fuelgas via clathrate hydrate in the presence of tetrahydrofuran; Applied Energy vol. 214; Mar. 15, 2018; 2 Pages; Abstract Only.
(Continued)

*Primary Examiner* — Miguel A Diaz
(74) *Attorney, Agent, or Firm* — Oblon, McClelland, Maier & Neustadt, L.L.P.

(57) ABSTRACT

A gas hydrate desalination system that includes a reactor with a detachable water jacket and thermocouples. The reactor has a detachable lid having a liquid inlet, a gas inlet, sapphire glass lenses, and lid cameras. An exit concentrate channel is provided at a bottom of the reactor. A mixing unit of the system includes a liquid storage tank connected to the reactor through the liquid inlet, and a gas feed cylinder connected the reactor through the gas inlet. A resolving unit of the system includes a sieve filter column for filtering brine from gas hydrate. The sieve filter column is connected to the exit concentrate channel and a first fraction column, which is connected to a brine column. The channel is further connected to a second fraction column, which is connected to the brine column for separating freshwater from the gas hydrate.

20 Claims, 8 Drawing Sheets

(52) U.S. Cl.
CPC ...... *C02F 2209/02* (2013.01); *C02F 2209/03* (2013.01); *C02F 2209/38* (2013.01); *C02F 2209/40* (2013.01)

(56) References Cited

FOREIGN PATENT DOCUMENTS

| CN | 112619558 A | 4/2021 |
|----|-------------|--------|
| CN | 112031711 B | 7/2021 |

OTHER PUBLICATIONS

Duquesnay et al. ; Novel gas hydrate reactor design. 3-in-1 assessment of phase equilibria,morphology and kinetics ; Fluid Phase Equilibria vol. 413 ; Apr. 15, 2016 ; 1 Page ; Abstract Only.

* cited by examiner

GAS HYDRATE DESALINATION SYSTEM

STATEMENT OF ACKNOWLEDGEMENT

Funding for this research work by the Deputyship for Research & Innovation, Ministry of Education in Saudi Arabia through the project number IFPNC—002-135-2020, and King Abdulaziz University, DSR, Jeddah, Saudi Arabia is gratefully acknowledged. Support of the Universiti Teknologi Petronas is gratefully acknowledged.

BACKGROUND

Technical Field

The present disclosure is directed to a desalination system, and particularly, to a gas hydrate desalination system and a method of desalinating seawater using the system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Increasing global population growth and the constant push for urban, industrial, and agricultural developments have resulted in a rising demand for freshwater. Desalinated seawater is the primary source of freshwater for many countries. Nearly 60 years of research and development have led to significant developments in desalination technologies. The technologies include distillation, membrane technology, crystallization, solvent extraction, ion exchange, and other state-of-the-art desalination techniques. The three most widely used flow desalination technologies are multi-effect distillation (MED), multi-stage flash (MSF), and reverse osmosis membrane (RO) for seawater, which have all been put to use in large-scale production applications. The energy requirements of these technologies are typically high, and they are accompanied by rapid corrosion, severe fouling, and demanding operational conditions. Because of constraints, such as insufficient environmental protection, these technologies require more effective, low-power desalination approaches to ensure safe environmental conditions.

Gas hydrate formation is an established technology utilized in several industries for applications such as gas hydrate inhibition, gas separation, gas storage, and gas transport. Gas hydrate formation as an approach to provide freshwater was first reported in the literature in the 1800s [Shahbazar, S and Hasan, N. *Gas hydrate formation condition: Review on experimental and modeling approaches. Fluid Phase Equilibria*, 2014, 379, 72-85]. Generally, gas hydrate technology uses a combination of water and hydrating agents present in seawater to form hydrate crystals by forming a solid water compound and a liquid separation product. Decomposition of the hydrate consequently forms freshwater, rendering a process that achieves seawater desalination by freezing. Gas hydrates have a low corrosion rate, are theoretically immune to fouling during the desalting process, and are hence a viable option for large scale desalination. In recent years interest in clathrate gas hydrate desalination as a desalination technology has been growing due to the relatively low energy requirements compared with thermal distillation and membrane desalination processes.

Typically, clathrate gas hydrates desalination is performed in batches. A complicated induction time presents conceptual and applied challenges such as interpretation of hydrate growth, hydrate structure, and salt crystal separation. In addition, quiescent gas hydrate desalination systems are not thought to be feasible for industrialization due to the lower kinetics of hydrate formation and the lack of understanding of thermodynamic equilibria among gas or gases and a water/promoters aqueous phase at necessity of pressure, temperature and additional driving force settings. Despite about a decade's worth of research, advancements in the desalination process based on hydrates have been stymied by an inadequate understanding and control of hydrate morphology, salt deposition, and separation of unreacted water. Therefore, there a need remains to develop a gas hydrate desalination system and a method that is more efficient and low in energy consumption.

Accordingly, it is one object of the present disclosure to provide a gas hydrate desalination system that is capable of determining phase equilibria and hydrate phase properties as well as the assessment of kinetics of the hydrate formation and destabilization processes. It is also an object of the present disclosure to develop a gas hydrate desalination system that is more efficient and consume less energy compared to known systems.

SUMMARY

In an exemplary embodiment, a gas hydrate desalination system is described. The system includes a gas hydrate generating and conveying unit, a gas-liquid supplying and mixing unit, and a gas hydrate dissociating and resolving unit. The gas hydrate generating and conveying unit includes a hydrate crystallizer reactor with a detachable water jacket surrounding a portion of the hydrate crystallizer reactor and a plurality of thermocouples disposed within the hydrate crystallizer reactor. The gas hydrate generating and conveying unit includes a detachable lid of the hydrate crystallizer reactor having a liquid inlet and a gas inlet. The gas hydrate generating and conveying unit further includes at least two sapphire glass lenses disposed on an outer surface of the detachable lid, a pressure sensor disposed inside the hydrate crystallizer reactor, a plurality of lid cameras disposed outside the hydrate crystallizer reactor proximal to the sapphire glass lenses, an exit concentrate channel at a bottom of the hydrate crystallizer reactor that has a length in a longest dimension of from 0.6 to 0.8 times a length of the hydrate crystallizer reactor, and heat transfer tubes configured to cool hydrate crystals formed in the hydrate crystallizer reactor. The gas-liquid supplying and mixing unit includes a liquid storage tank fluidly connected to a first pump that is fluidly connected to the hydrate crystallizer reactor through the liquid inlet, and a gas feed cylinder fluidly connected to a second pump that is fluidly connected to the hydrate crystallizer reactor through the gas inlet. The gas hydrate dissociating and resolving unit includes a third pump fluidly connected to the exit concentrate channel, a second fraction column, and a sieve filter column. The sieve filter column is fluidly connected to a first fraction column through a sieve filter outlet. The first fraction column is fluidly connected to a first fraction column channel through a first fraction column outlet and the first fraction column channel is fluidly connected to a brine column through the first fraction column outlet. The second fraction column is fluidly connected to a second fraction column channel through a second fraction column outlet and the second fraction column channel is fluidly connected to the brine column through the second fraction column outlet. The first fraction column outlet, the second fraction column outlet, and a brine column inlet are disposed at a same height relative to the brine column.

In some embodiments, the system further includes a data acquisition system that records pressure, temperature, and hydrate morphologies measurements within the hydrate crystallizer reactor. The data acquisition system monitors flow rates from the gas feed cylinder and the liquid storage tank and records a pressure in the sieve filter column.

In some embodiments, the hydrate morphologies measurements are captured by the plurality of lid cameras. The plurality of thermocouples includes at least four reactor thermocouples disposed inside the hydrate crystallizer reactor, at least four liquid thermocouples disposed inside the hydrate crystallizer reactor, and at least three gas thermocouples disposed inside the hydrate crystallizer reactor.

In some embodiments, the hydrate crystallizer reactor accommodates a total volume of between 500 cm$^3$ and 1500 cm$^3$.

In some embodiments, the hydrate crystallizer reactor accommodates a liquid volume of between 10 cm$^3$ and 100 cm$^3$.

In some embodiments, the hydrate crystallizer reactor is fabricated of 316 titanium stainless steel.

In some embodiments, the hydrate crystallizer reactor has a stainless-steel micromesh to separate a carbon dioxide hydrate and salt brine.

In some embodiments, the hydrate crystallizer reactor further includes a magnetic plate disposed at the bottom of the hydrate crystallizer reactor.

In some embodiments, the detachable lid is substantially parabolic.

In some embodiments, the bottom of the hydrate crystallizer reactor is substantially parabolic as to promote rapid discharge of the produced salt brine.

In some embodiments, the hydrate crystallizer reactor is a batch reactor.

In some embodiments, the system further includes a series of batch reactors in a range of 2 reactors to 8 reactors.

In some embodiments, the desalination method is described. The desalination method includes generating a carbon dioxide hydrate from $CO_2$ and saltwater within the hydrate crystallizer reactor of the system, and separating the carbon dioxide hydrate and produced salt brine with the sieve filter column to obtain freshwater and the clathrate gas hydrate.

In some embodiments, the hydrate crystallizer reactor employs a stainless-steel micromesh to separate the carbon dioxide hydrate and the produced salt brine for the sieve filter column. A plurality of sieve cameras is disposed proximal to the sieve filter column to monitor hydrate formation and dissociation in the sieve filter column.

In some embodiments, the method includes dissociating gas hydrate salts ions with the freshwater, flushing the gas hydrate salts ions with the freshwater through the second fraction column, transporting the gas hydrate salts ions with the freshwater to the brine column and adding the produced brine to the brine column with the gas hydrate salts ions and the freshwater.

In some embodiments, the method includes transporting the clathrate gas hydrate, the freshwater, hydrocarbon promoters, and a gas to a third fraction column to further isolate the clathrate gas hydrate.

In some embodiments, the gas is carbon dioxides In some embodiments, the gas is recovered in a temperature range from 20° C. to 30° C., and the hydrocarbon promoters are recovered in a temperature range from 30° C. to 50° C.

In some embodiments, a coolant stream comprising ethylene glycol and water is circulated through the detachable water jacket to stabilize a temperature within the hydrate crystallizer reactor.

In some embodiments, the plurality of lid cameras captures images at a pre-determined time interval, and the hydrate gas is recycled to the second pump.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
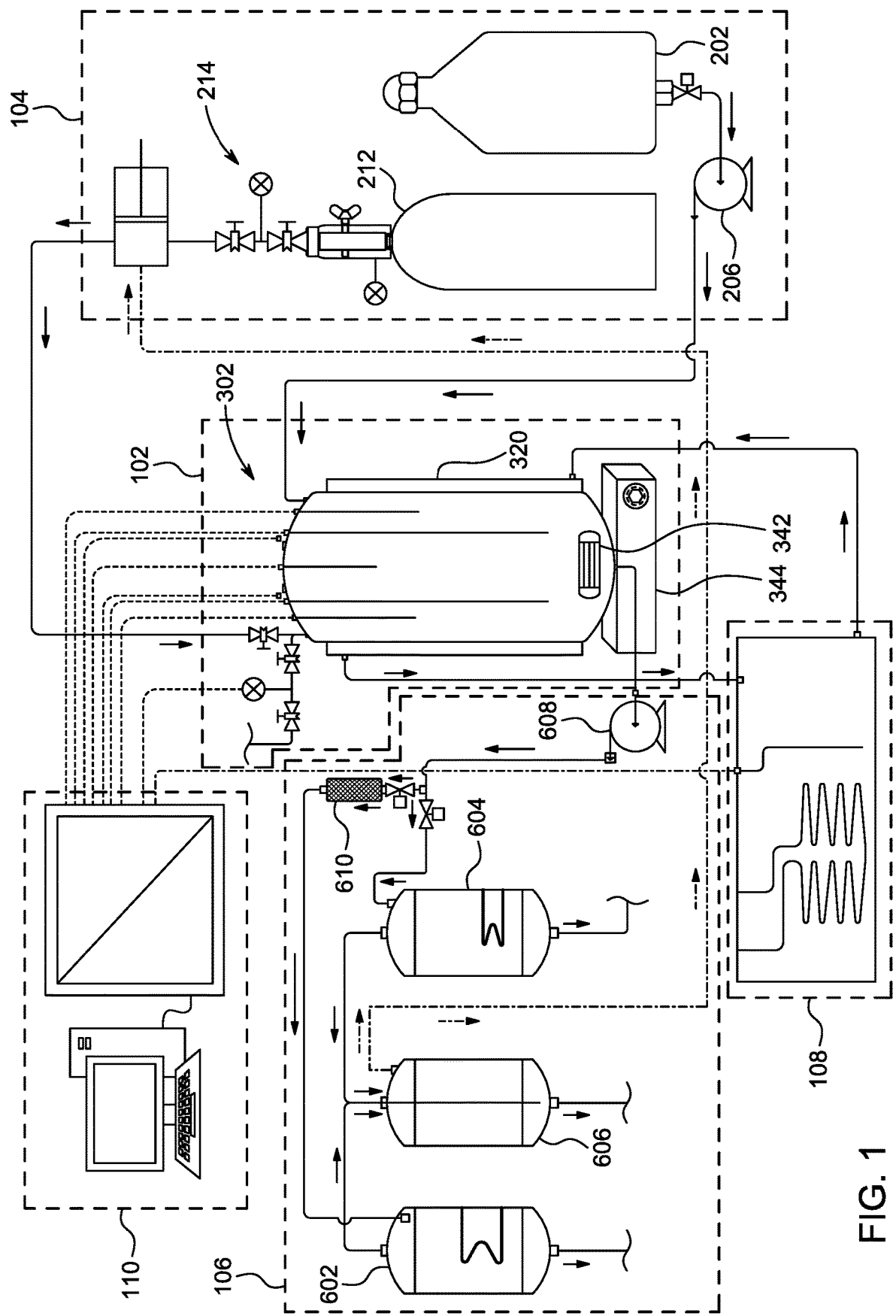
FIG. 1 is a schematic block diagram of a gas hydrate desalination system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

"Clathrate hydrate" refers to a crystalline or semi-crystalline or amorphous solid including water molecules in a cage-like structure containing a compound within the cage-like structure.

"Formation" refers to the phase-change process by which a clathrate hydrate phase forms from a crystal to generate a bulk clathrate hydrate.

Aspects of the present disclosure are directed to a gas hydrate desalination system and a desalination method. The system includes a reactor to generate gas hydrate from seawater and a gas, such as carbon dioxide, supplied by a mixing unit. The system further includes a resolving unit to separate freshwater from the gas hydrate. The method includes generating a carbon dioxide hydrate ($CO_2$hyd.) from $CO_2$ and saltwater by a first-stage saline water desalination system and then resolving the $CO_2$ hyd. to obtain fresh water. Moreover, at the first stage, the $CO_2$ hyd. is formed in the presence of and at the lowest boiling point of one or more hydrocarbon solvents as promoters under low pressure, for example at 25-35 bar preferably about 30 bar and at temperature of 2-5° C. preferably about 3° C. Separating a salt brine from the $CO_2$ hyd. by a second stage of the desalination system and then resolving the $CO_2$ hyd. to obtain fresh water. Within the system a reactor is equipped to permit monitoring of the $CO_2$ hyd. structural morphology with, e.g., full high definitions (FHD) cameras, to observe and analyze the kinetics of $CO_2$ hyd. formation and dissociation. Also, within the reactor, a stainless-steel micromesh is provided to ensure the retention of hydrate crystals during a brine separation step in which $CO_2$ hyd. is separated and/or isolated from salt-containing material. The two-stage saline water desalination system includes a first-stage $CO_2$ hyd. saline water desalination system and a second-stage freshwater systems that includes promoters and utilizes a $CO_2$ separation system. Each system is integrated into a series, and each saline water desalination stage includes a gas-liquid supplying and mixing unit, a gas hydrate generating and conveying unit comprising the reactor, a the gas hydrate dissociating and resolving unit.

Aspects of the disclosure also relate to a filter-based real image gas hydrate experimental apparatus and process for observing and applying clathrate gas hydrate technology for desalination. The apparatus includes a batch reactor equipped with a magnetic stirrer, liquid feed, gas feed, brine sampling, gas sampling, and visual monitoring instruments. The disclosure is typically employed in experiments involving kinetics and phase equilibrium of clathrate formation and dissociation. Equipment such as gas chromatography, DSC, Raman spectroscopy, X-ray measurements, and nuclear magnetic resonance spectroscopy are examples of analytical instruments that may used to measure the structural and physical features of gas hydrates formed when the system is in operation. The apparatus of the present disclosure is designed with features needed to research gas hydrate desalination production, accumulation, and destabilization at a macroscopic level. However, additional features have been introduced to increase its usage flexibility and make it possible to conduct mesoscopic-scale research on gas hydrates using sensors.

Referring to FIG. 1, a schematic block diagram of a gas hydrate desalination system 100 is illustrated, according to an embodiment of the present disclosure. The gas hydrate desalination system 100 includes a gas hydrate generating and conveying unit 102, a gas-liquid supplying and mixing unit 104 configured to be in fluid communication with the gas hydrate generating and conveying unit 102 upstream of the gas-liquid supplying and mixing unit 104, and a gas hydrate dissociating and resolving unit 106 configured to be in fluid communication with the gas hydrate generating and conveying unit 102 and downstream thereof. In an embodiment, the gas hydrate generating and conveying unit 102, the gas-liquid supplying and mixing unit 104, and the gas hydrate dissociating and resolving unit 106 are disposed within the same housing. In the context of one aspect of the present disclosure the term "within the same housing" describes a compact processing unit that minimizes footprint and space requirements by sharing boundaries of processing equipment. For example, process equipment from any one of units 102, 104 and 106 may share a common wall (e.g., reactor wall) and/or be connected directly such that an inlet opening on process equipment is directly connected to an outlet opening on process equipment in a different unit. This arrangement avoids interstitial piping and minimizes fluid flow requirements and energy loss. In another aspect the term "within the same housing" describes a compact processing unit in which submits are separate modular units that may be entirely connected and disconnected from one another.

In an embodiment, the gas hydrate generating and conveying unit 102 is disposed in a first housing, the gas-liquid supplying and mixing unit 104 is disposed in a second housing, and the gas hydrate dissociating and resolving unit 106 is disposed in a third housing. In an embodiment, the first, second, and third housing are each fabricated of the same material, such as a metal or a plastic. In an embodiment, the first, second, and third housing are fabricated of different materials. The gas hydrate desalination system 100 further includes a cooling system 108 disposed in communication with the gas hydrate generating and conveying unit 102 to provide desired cooling or heating to the gas hydrate generating and conveying unit 102 during formation of the gas hydrate. In an embodiment, the cooling system 108 is preferably disposed in a fourth housing separate and remote from each of the first, second, and third housing. In an embodiment, the cooling system 108 is disposed in a fourth housing separate from a combined housing with each of the first, second, and third housing. The gas hydrate desalination system 100 further includes a data acquisition system 110 configured to receive data indicative of pressure, temperature, and hydrate morphology measurements from the gas hydrate generating and conveying unit 102. In an embodiment, the data acquisition system 110 is disposed within a fifth housing preferably separate from each of the first, second, third, and fourth housing. In an embodiment, the gas hydrate desalination system comprises three total housings, the first of which is the combined housing with the gas hydrate generating and conveying unit 102 is disposed in a first housing, the gas-liquid supplying and mixing unit 104 is disposed in a second housing, and the gas hydrate dissociating and resolving unit 106 is disposed in a third housing, the cooling system 108 disposed in the fourth housing, and the data acquisition system 110 disposed in the fifth housing.

Figure 2:
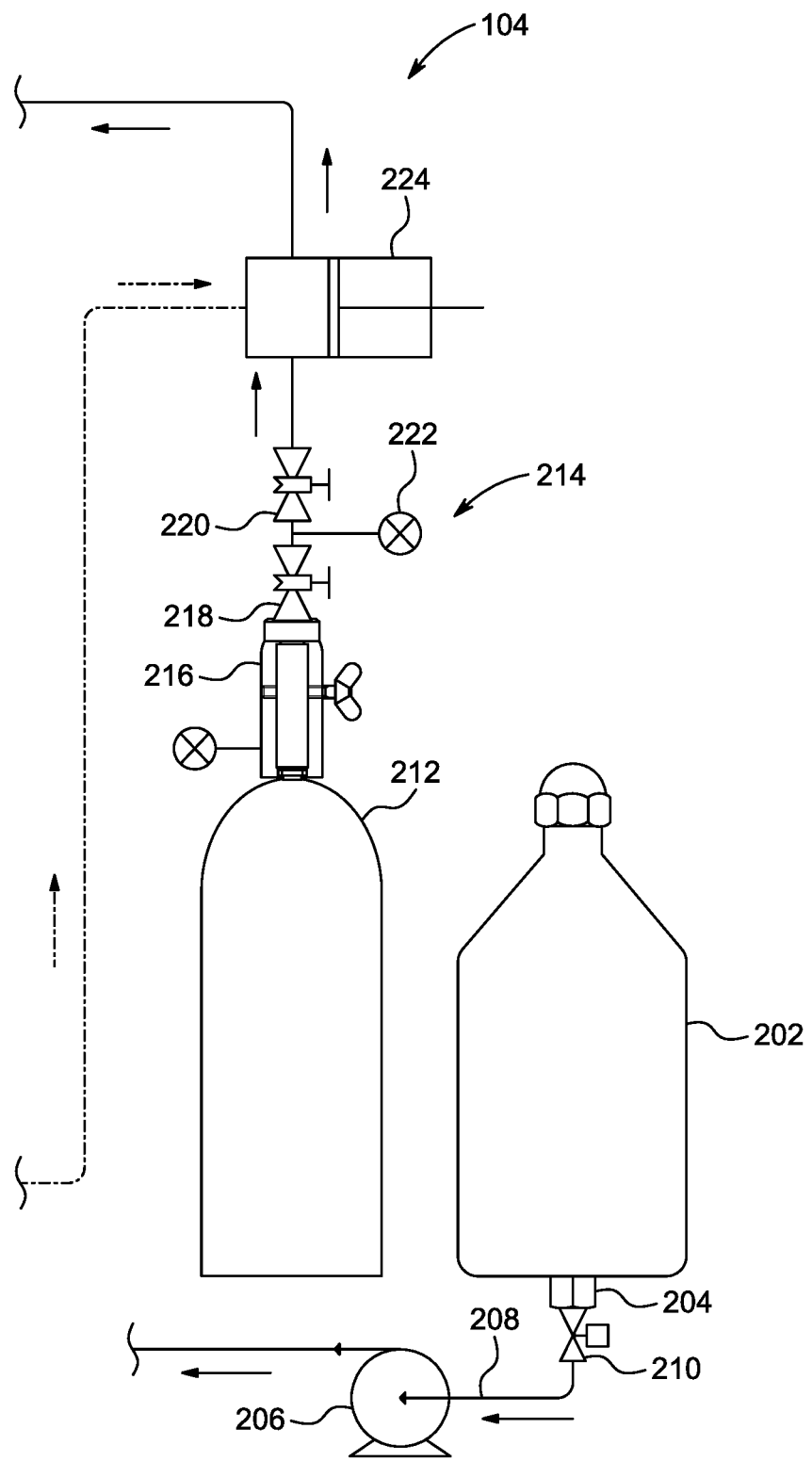
FIG. 2 is a schematic enlarged block diagram of a gas-liquid supplying and mixing unit of the gas hydrate desalination system of FIG. 1, according to certain embodiments.

Referring to FIG. 2, a schematic enlarged block diagram of the gas-liquid supplying and mixing unit 104 of the gas hydrate desalination system 100 of FIG. 1 is illustrated, according to an embodiment of the present disclosure. Referring to FIG. 1 and FIG. 2, the gas-liquid supplying and mixing unit 104 includes a liquid storage tank 202 configured to store sea water and feed the sea water to the gas hydrate generating and conveying unit 102. In an embodiment, the liquid storage tank 202 is fabricated out a composite material with a metal lining, such as polyethylene with a steel lining. In an embodiment, the liquid storage tank 202 is shaped like a cylinder. The liquid storage tank 202 includes a bottom outlet port 204 that is fluidly connected to a first pump 206 through a feed water channel 208. In an embodiment, the bottom outlet port 204 is substantially cylindrical and has a diameter from 0.1 to 0.2 times the diameter of the liquid storage tank 202, preferably 0.15 times greater. In an embodiment, the first pump 206 is an axial-flow pump or centrifugal pump. A flow control valve 210 is connected to the feed water channel 208 to allow or restrict flow of the sea water from the liquid storage tank 202. In an embodiment, the flow control valve 210 is a needle, globe, or gate valve instead. The first pump 206 is further fluidly connected to the gas hydrate generating and conveying unit 102 to pump the sea water from the liquid storage tank 202 to the gas hydrate generating and conveying unit 102 at a desired flow rate. The gas-liquid supplying and mixing unit 104 further includes a gas feed cylinder 212 configured to store a gas, such as a carbon dioxide ($CO_2$), and feed the gas to the gas hydrate generating and conveying unit 102 through a gas feed assembly 214. In an embodiment, the gas feed cylinder 212 is fabricated out of a composite material or a metal. In an embodiment, the gas feed cylinder 212 is substantially cylindrical. In an embodiment, a diameter of the gas feed cylinder 212 is equal to a diameter if the liquid feed storage tank 202. The gas feed assembly 214 includes a first pressure control valve 216 and a pressure safety valve 218 together configured to control a gas feed pressure. The gas feed assembly 214 further includes a second pressure control valve 220 configured to set the gas feed pressure at a desired pressure value before the gas is supplied to the gas hydrate generating and conveying unit 102. In an embodiment, the first pressure control valve 216 is sized the same as the second pressure control valve 220. The desired pressure value of the feed gas may be set using a pressure gauge 222 of the gas feed assembly 214. In an embodiment, the pressure gauge is one selected from the group consisting of a bourdon tube pressure gauge, a diaphragm pressure gauge, a capsule pressure gauge, an absolute pressure gauge, a differential pressure gauge, a bellows pressure gauge, a manometer pressure gauge, and a piezometer pressure gauge. The gas feed assembly 214 further includes a second pump 224, otherwise referred to as the booster pump 224, fluidly connected to the gas hydrate generating and conveying unit 102 to supply the gas at the desired pressure value set by the second pressure control valve 220. In an embodiment, the second pump 224 has the same sizing and power properties as the first pump 206. In an embodiment, the second pump 224 is a compressor pump.

Figure 3:
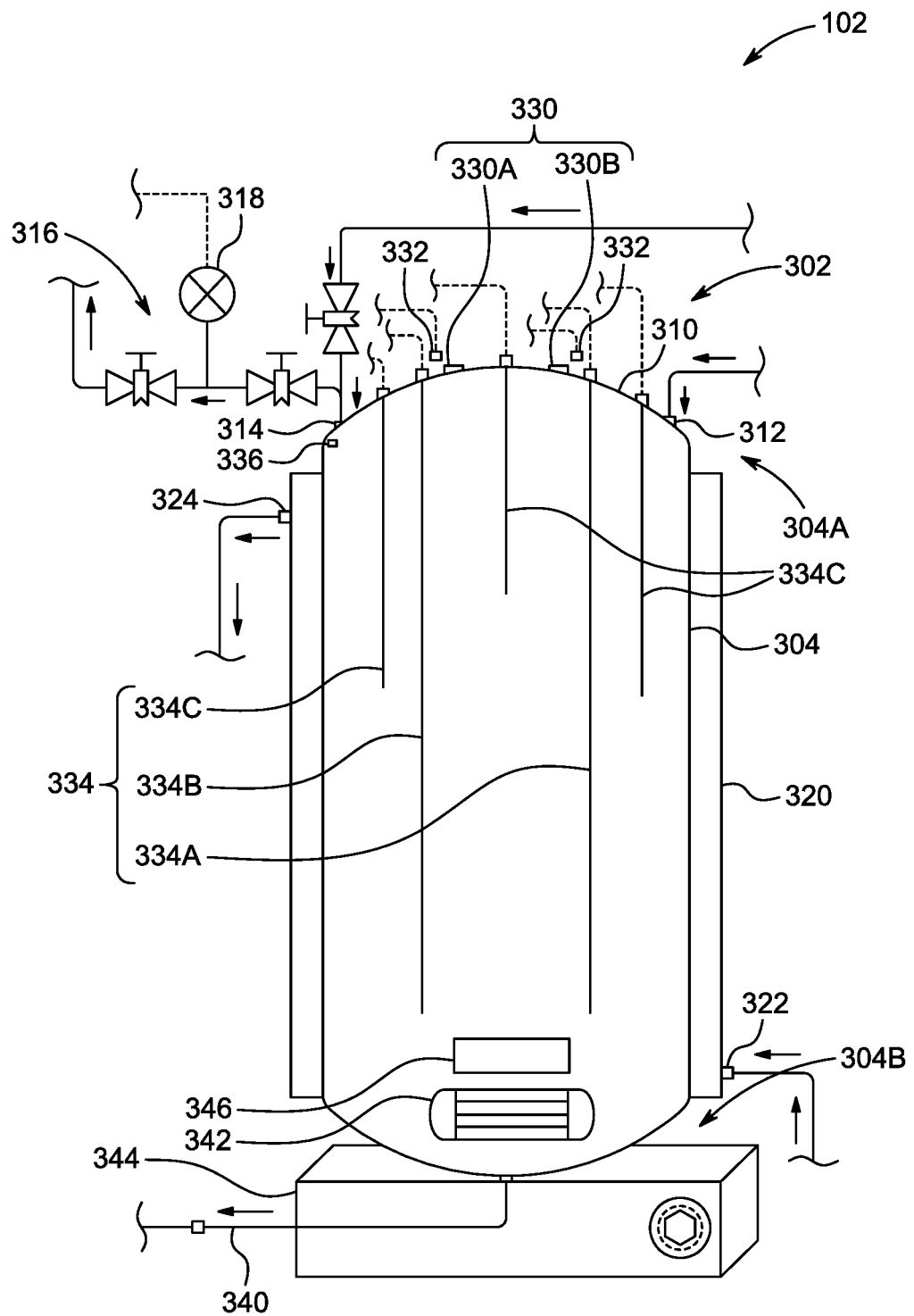
FIG. 3 is a schematic enlarged block diagram of a gas hydrate generating and conveying unit of the gas hydrate desalination system of FIG. 1, according to certain embodiments.

Referring to FIG. 3, a schematic enlarged block diagram of the gas hydrate generating and conveying unit 102 of the gas hydrate desalination system 100 of FIG. 1 is illustrated, according to an embodiment of the present disclosure. The gas hydrate generating and conveying unit 102 includes a hydrate crystallizer reactor 302 configured to generate the gas hydrate. According to the present disclosure, a bench-scale wide-neck jacket cooled or heated crystallizer reactor is shown in FIG. 3. The hydrate crystallizer reactor 302 includes a cylindrical body 304 having a top end 304A and a bottom end 304B. In an embodiment, the cylindrical body 304 of the hydrate crystallizer reactor 302 is fabricated of 316-titanium stainless steel. In an embodiment, the hydrate crystallizer reactor 302 is fabricated of copper, steel, titanium, aluminum, or the like. Each of the top end 304A and the bottom end 304B is substantially parabolic. Particularly, the bottom end 304B, otherwise referred to as the bottom 304B, of the hydrate crystallizer reactor 302 is substantially parabolic to promote rapid discharge of produced salt brine. The gas hydrate generating and conveying unit 102 further includes a detachable lid 310 to close the top end 304A of the hydrate crystallizer reactor 302. In an embodiment, the detachable lid 310 is attached to the top end 304A of the hydrate crystallizer reactor 302 by fastening means, such as a hinge or screws, to allow rigid attachment during operation, but make it relatively easy to remove the detachable lid 302 after operation is complete. In an embodiment, the detachable lid 310 is also fabricated of 316-titanium stainless steel. The detachable lid 310 is substantially parabolic and includes a liquid inlet 312 and a gas inlet 314 defined in a body of the detachable lid 310. The liquid inlet 312 is configured to fluidly connect with the liquid storage tank 202 through the first pump 206 and the gas inlet 314 is configured to fluidly connect with the gas feed cylinder 212 through the second pump 224. In an embodiment, the liquid inlet 312 and the gas inlet 314 are disposed at the same height relative to the top end 304A of the hydrate crystallizer reactor 302. In an embodiment, the liquid inlet 312 and the gas inlet 314 are shaped like cones, funnels, or cylinders. In some embodiments, the gas inlet 314 may further include a plurality of pressure control valves 316 and a pressure gauge 318 together configured to set the desired pressure value of the feed gas within the hydrate crystallizer reactor 302. In an embodiment, the plurality of pressure control valves 316 is from 2 to 10 valves, preferably from 4 to 8 valves, or 6 valves. In an embodiment, there is more than 1 pressure gauge 318. A portion of the hydrate crystallizer reactor 302 defined between the top end 304A and the bottom end 304B thereof is surrounded with a detachable water jacket 320, which in turn fluidly connected to the cooling system 108. Particularly, the detachable water jacket 320 includes an inlet port 322 and an outlet port 324 configured to fluidly communicate with the cooling system 108. In an embodiment, the inlet port 322 is disposed proximal to the bottom end 304B of the hydrate crystallizer reactor 302 and the outlet port 324 is disposed proximal to the top end 304A of the hydrate crystallizer reactor 302. In an embodiment, the length between the top end 304A and the bottom end 304B, in essence the length of the hydrate crystallizer reactor 302, is from 1.1 to 1.5 times greater than a length between the inlet port 322 and the outlet port 324, preferably from 1.2 to 1.4 times greater, or 1.3 times greater. The hydrate crystallizer reactor 302 along with the detachable water jacket 320 utilizes the positively optimistic gas hydrate to extract fresh water from the sea water. In some embodiments, the temperature of the detachable water jacket 320 may be controlled by an external refrigerator of the cooling system 108 and the experimental temperature of the hydrate crystallizer reactor 302 may be adjusted with the precision of ±0.01° C. In an embodiment, the coolant used in the detachable water jacket 320 is an antifreeze solution. According to the present disclosure, the hydrate crystallizer reactor 302 is a batch reactor. In some embodiments, the hydrate crystallizer reactor 302 accommodates a total volume of between 500 $cm^3$ and 1500 $cm^3$, preferably from 750 $cm^3$ to 1250 $cm^3$, or 1000 $cm^3$ and a liquid volume of between 10 $cm^3$ and 100 $cm^3$, preferably from 25 $cm^3$ to 75 $cm^3$, or 50 $cm^3$.

The gas hydrate generating and conveying unit 102 further includes a plurality of sapphire glass lenses 330 disposed on an outer surface of the detachable lid 310. In an embodiment, the plurality of sapphire glass lenses 330 includes a first sapphire glass lens 330A and a second sapphire glass lens 330B mounted on the body of the detachable lid 310. The plurality of sapphire glass lenses 330 are used for monitoring gas hydrate forming morphology on a real-time basis. Further, interface of the gas and the liquid contents may be observed at center of the sapphire glass lenses 330, which is beneficial for obtaining a more explicit version of images of gas hydrate growth process. In an embodiment, the plurality of sapphire lenses includes from 3 to 10 sapphire lenses, preferably from 4 to 9 sapphire lenses, preferably from 5 to 8 sapphire lenses, or 6 sapphire lenses. In an embodiment, the first sapphire glass lens 330A and the second sapphire glass lens 330B are mounted at the same height as the liquid inlet 312 and the gas inlet 314 relative to the top end 304A of the hydrate crystallizer reactor 302. A plurality of lid cameras 332 disposed outside the hydrate crystallizer reactor 302 proximal to the sapphire glass lenses 330 may be used for capturing images of the gas hydrate growth process. Particularly, the plurality of lid cameras 332 are configured to capture images of the hydrate morphologies at a pre-determined time interval. In an embodiment, the plurality of lid cameras 332 are from 2 to 10 cameras, preferably from 4 to 8 cameras, or 6 cameras. In an embodiment, an individual camera of the plurality of cameras 332 can capture images at a rate of from 5 photos/minute to 25 photos/minute, preferably from 10 photos/minute to 20 photos/minute, or 15 photos/minute. The gas hydrate generating and conveying unit 102 further includes a plurality of thermocouples 334 disposed within the hydrate crystallizer reactor 302. The plurality of thermocouples 334 includes a plurality of reactor thermocouples 334A, a plurality of liquid thermocouples 334B, and a plurality of gas thermocouples 334C disposed inside the hydrate crystallizer reactor 302. According to the present disclosure, the plurality of thermocouples 334 includes at least four reactor thermocouples 334A, at least four liquid thermocouples 334B, and at least three gas thermocouples 334C. The plurality of thermocouples 334 is used to differentiate the kinetic and equilibrium behavior of the gas hydrate during the formation and deformation thereof. The liquid thermocouples 334B and the gas thermocouples 334C are used to measure temperature of the liquid and the gas, respectively, within the hydrate crystallizer reactor 302 with the precision of ±0.1° C. The gas hydrate generating and conveying unit 102 further includes a pressure sensor 336 disposed inside the hydrate crystallizer reactor 302. The pressure sensor 336 is used to measure the gas pressure inside the hydrate crystallizer reactor 302 with the precision of ±0.1 bar. In an embodiment, the pressure sensor is disposed below the liquid inlet 312 and the gas inlet 314 relative to the top end 304A of the hydrate crystallizer reactor 302.

The gas hydrate generating and conveying unit 102 further includes an exit concentrate channel 340 at the bottom 304B of the hydrate crystallizer reactor 302 that has a length in a longest dimension of from 0.6 to 0.8 times a length of the hydrate crystallizer reactor 302, preferably 0.7 times a length. Particularly, the exit concentrate channel 340 is defined at a center of the parabolic shape of the bottom end 304B to promote rapid discharge of the produced salt brine. The center of the parabolic bottom end 304B can further be defined as a point equidistant from a first inner surface of the detachable water jacket 320 on the right side of the hydrate crystallizer reactor 302 to a second inner surface of the detachable water jacket 320 on the left side of the hydrate crystallizer reactor 302, as seen in FIG. 3. The exit concentrate channel 340 is further configured to fluidly communicate with the gas hydrate dissociating and resolving unit 106 of the gas hydrate desalination system 100 to discharge the produced salt brine to the gas hydrate dissociating and resolving unit 106. The gas hydrate generating and conveying unit 102 further includes a multi-speed magnetic stirrer 342 placed directly at the bottom 304B of the hydrate crystallizer reactor 302 to agitate the gas hydrate contents inside the hydrate crystallizer reactor 302 with the help of a magnetic plate 344. In an embodiment, the magnetic stirrer 342 has 3 different speed settings, a slow setting, a medium setting, and a fast setting, with varying degrees of rotational speed. In an embodiment, the magnetic plate 344 is disposed at the bottom end 304B of the hydrate crystallizer reactor 302. The hydrate crystallizer reactor 302 further includes a stainless-steel micromesh 346, schematically shown in FIG. 3, to separate the carbon dioxide hydrate and the salt brine. In an embodiment, the stainless-steel micromesh 346 has a pore size ranging from 10 μm to 600 μm, preferably from 100 μm to 500 μm, preferably from 200 μm to 400 μm, or 300 μm.

In a preferred embodiment the magnetic stirrer 342 and the exit concentrate channel 340 form a nipple at the apex of the parabolic bottom end 304B of the reactor. The nipple forms an extension of the reactor and has a width slightly larger than the width of the magnetic stirrer 342. The nipple extends to a depth sufficient to permit complete submersion of the magnetic stirrer 342 in liquid present in the reactor. An extension connects the top of the nipple to the bottom end of the reactor 304B. The extension is a funnel-shaped finned connector having a top diameter and a bottom diameter. The bottom diameter has the same diameter as the inner diameter of the nipple and is sufficient to accommodate the full length of magnetic stirrer. The top diameter is from 1.5× to 2× the diameter of the bottom diameter. The slanted portion of the funnel shaped extension includes a series of fins that extend from the bottom surface of the funnel to a height that is substantially in line with the parabolic bottom surface 304B. The fins extend radially towards the center defined by the longitudinal vertical axis of the channel 340. Each fan is angled in the same direction corresponding to the direction of spin of the magnetic stirrer 342. The fins function to transmit stirring action from the magnetic stir rotating at the bottom of the nipple to the bulk liquid materials present in the reactor 304. There are preferably at least 12, at least 16, at least 20 or at least 24 fins present in the extension.

Figure 4:
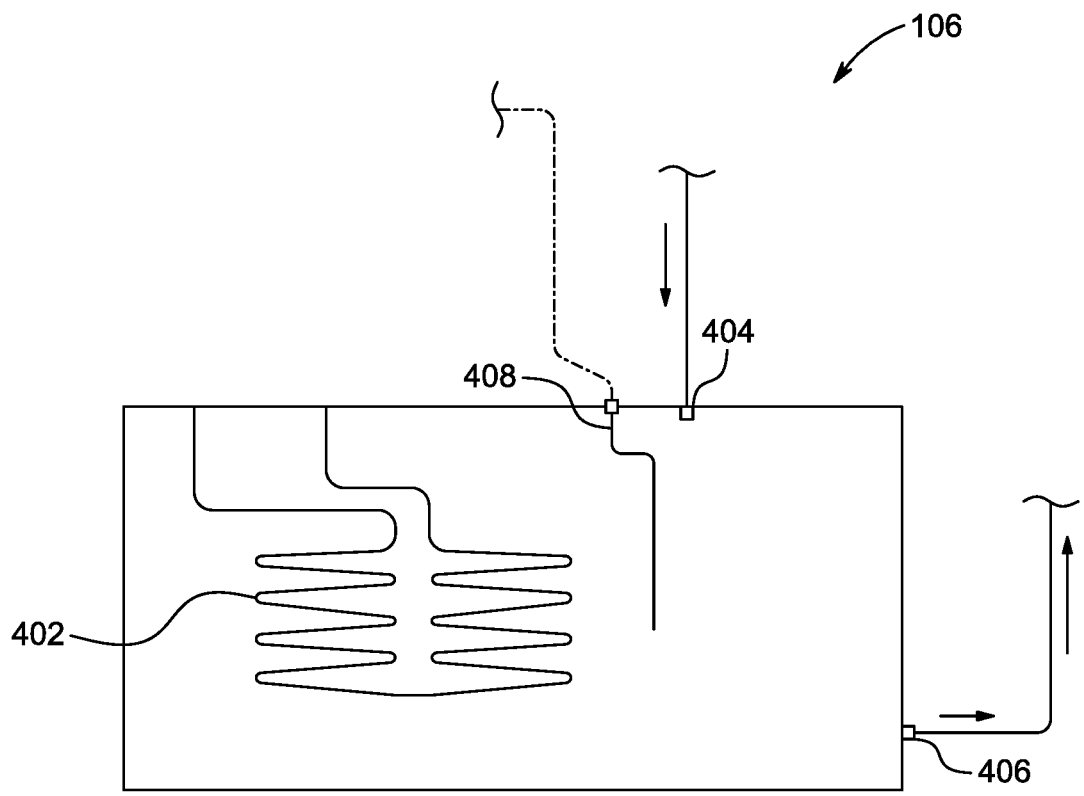
FIG. 4 is a schematic enlarged block diagram of a cooling system of the gas hydrate desalination system of FIG. 1, according to certain embodiments.

Referring to FIG. 4, a schematic enlarged block diagram of the cooling system 108 of the gas hydrate desalination system 100 of FIG. 1 is illustrated, according to an embodiment of the present disclosure. The cooling system 108 is configured to provide an auto-cooling during the gas hydrate formation which includes a subcooling system to sustain the hydrate crystals during and after full hydrate growth. Particularly, the cooling system 108 includes heat transfer tubes 402 configured to cool hydrate crystals and/or a circulated fluid/liquid that is in contact with the hydrate crystals formed in the hydrate crystallizer reactor 302. In an embodiment, the cooling system 108 includes from 4 to 40 heat transfer tubes 402, preferably from 8 to 36, preferably from 12 to 32, preferably from 16 to 28, preferably from 20 to 24, or 22 heat transfer tubes 402. The cooling system 108 further includes an inlet 404 configured to be in fluid communication with the detachable water jacket 320 to supply a coolant stream to the detachable water jacket 320 and an outlet 406 configured to be in communication with the detachable water jacket 320 to receive hot water from the detachable water jacket 320. Particularly, the inlet 404 of the cooling system 108 is configured to fluidly communicate with the inlet port 322 of the detachable water jacket 320 and the outlet 406 of the cooling system 108 is configured to fluidly communicate with the outlet port 324 of the detachable water jacket 320. As such, the detachable water jacket 320 and the cooling system 108 together define a closed loop cooling system to cool or heat the gas hydrate generating and conveying unit 102 based on the temperature thereof during the gas hydrate formation. In an embodiment, the coolant stream includes ethylene glycol and water. The coolant stream is circulated through the detachable water jacket 320 to stabilize the temperature within the hydrate crystallizer reactor 302. In some embodiments, testing a sample of a heat flux fluid, e.g., water coolant, is one way to determine whether it can form a gas hydrate and/or has a history of hydrates. Upon determining the temperature of the water coolant using a thermocouple 408 of the cooling system 108, the sample is cooled to assess how much chilling is necessary to promote the gas hydrate formation. The result is further compared to the amount of cooling needed at the outlet 406 to cause the gas hydrate formation in the sample that had previously undergone heat treatment to remove any hydrate history. Methods for preventing or controlling the production of fluid hydrates in the gas hydrate desalination system 100 are also disclosed. The fluid composition or the conditions of the gas hydrate desalination system 100 are modified as necessary based on how much hydrate formation in the fluid is inhibited.

Figure 5:
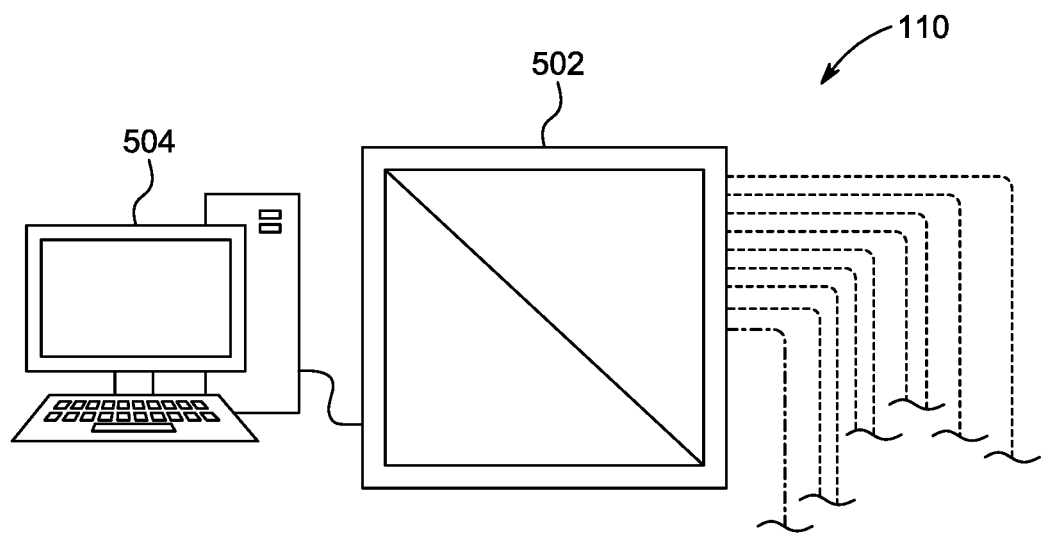
FIG. 5 is a schematic enlarged block diagram of a data acquisition system of the gas hydrate desalination system of FIG. 1, according to certain embodiments.

Referring to FIG. 5, a schematic enlarged block diagram of the data acquisition system 110 of the gas hydrate desalination system 100 of FIG. 1 is illustrated, according to an embodiment of the present disclosure. The data acquisition system 110 includes a controller 502 configured to be in communication with various elements of the gas hydrate generating and conveying unit 102, the gas-liquid supplying and mixing unit 104, the gas hydrate dissociating and resolving unit 106, and the cooling system 108 either controlled or monitored via electric signals. The data acquisition system 110 further includes a display unit 504 configured to be in communication with the controller 502 and to display operating parameters of the gas hydrate desalination system 100. The data acquisition system 110 records the pressure, the temperature, and the hydrate morphology measurements within the hydrate crystallizer reactor 302. The hydrate morphology measurements, e.g., images, are captured by the plurality of lid cameras 332. The data acquisition system 110 is in communication with the plurality of lid cameras 332 to record the hydrate structure and the morphology including size and shape thereof. Further, the data acquisition system 110 is in communication with the plurality of thermocouples 334 and the pressure sensor 336 disposed in the gas hydrate generating and conveying unit 102 and the thermocouple 408 disposed in the cooling system 108 to control the temperature and pressure of the gas hydrate within the hydrate crystallizer reactor 302 of the gas hydrate generating and conveying unit 102. In some embodiments, the data acquisition system 110 may also be in communication with the pressure control valves 316 of the gas hydrate generating and conveying unit 102 and the first and second pressure control valves 216, 220 of the gas-liquid supplying and mixing unit 104 to set the desired pressure value of the feed gas. Moreover, the data acquisition system 110 monitors flow rates from the gas feed cylinder 212 and the liquid storage tank 202.

Figure 6:
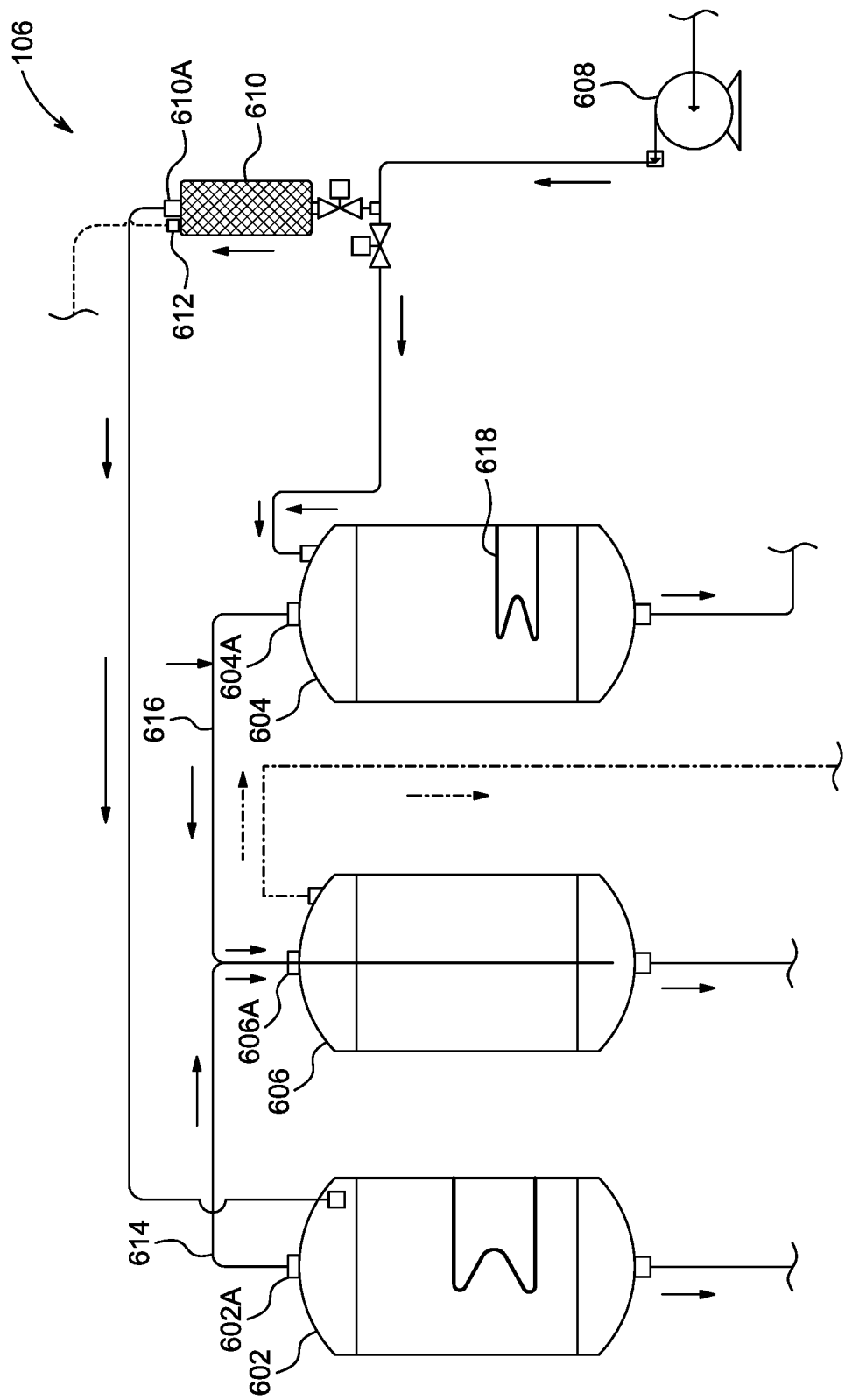
FIG. 6 is a schematic enlarged block diagram of a gas hydrate dissociating and resolving unit of the gas hydrate desalination system of FIG. 1, according to certain embodiments.

Referring to FIG. 6, a schematic enlarged block diagram of the gas hydrate dissociating and resolving unit 106 of the gas hydrate desalination system 100 of FIG. 1 is illustrated, according to an embodiment of the present disclosure. The gas hydrate dissociating and resolving unit 106 includes a plurality of columns configured to dissociate fresh water from the gas hydrate solution. According to the present disclosure, the plurality of columns includes a first fraction column 602 and a second fraction column 604 fluidly communicated with a brine column 606. In an embodiment, each of the first fraction column 602, second fraction column 604, and brine column 606 are fabricated of 316-titanium stainless steel. The gas hydrate dissociating and resolving unit 106 further includes a third pump 608 fluidly coupled to the exit concentrate channel 340 of the gas hydrate generating and conveying unit 102. In an embodiment, the third pump 608 is a centrifugal pump. The third pump 608 is further fluidly connected to a sieve filter column 610 and the second fraction column 604. The sieve filter column 610 is fluidly connected to the first fraction column 602 through a sieve filter outlet 610A. The sieve filter column 610 is configured to filter brine from the gas hydrate solution and fluidly communicate the brine with the second fraction column 604 via the sieve filter outlet 610A. In an embodiment, the sieve filter column 610 has a sieve filter with a pore size ranging from 10 μm to 300 μm, preferably from 50 μm to 250 μm, preferably from 100 μm to 200 μm, or 250 μm. Particularly, the third pump 608 along with the sieve filter column 610 help to separate brine or concentrated water from depressurized gas hydrate solution in a stable structure form. In some embodiments, the brine solution may be removed from the hydrate crystallizer reactor 302 at an ambient pressure via the third pump 608. Theoretically, a hydrate forming fluid is contacted with a brine solution and floating on the surface of the brine solution due to the density differences at a subcooling temperature. As such, the hydrate forming fluid forms a solid hydrate in the presence of one or more low boiling point hydrocarbon promoters. In an embodiment, methane, ethane, propane, hydrocarbons and/or diaromatics, or the like. Further, there is a precipitation of hydrate crystals solute and/or the concentrated water remaining after the hydrate formation, thereby to form a magma, gel or thick suspension comprising solid hydrate, any unreacted hydrate forming fluid and any unreacted aqueous solution. The hydrate forming fluid and at least part of the water constituent of the solid hydrate crystals are separated from the solute by the sieve filter column 610. The data acquisition system 110 may be in communication with the gas hydrate dissociating and resolving unit 106, particularly, records a pressure in the sieve filter column 610. In some embodiments, a plurality of sieve cameras 612 is disposed proximal to the sieve filter column 610 to monitor hydrate presence, formation and/or dissociation in the sieve filter column 610. In an embodiment, an individual camera of the plurality of sieve cameras 612 can capture images at a rate of from 5 photos/minute to 25 photos/minute, preferably from 10 photos/minute to 20 photos/minute, or 15 photos/minute.

The brine and the dissociated gas hydrate are further communicated with the plurality of columns. The first fraction column 602 is fluidly connected to a first fraction column channel 614 through a first fraction column outlet 602A. The first fraction column channel 614 is further fluidly connected to the brine column 606 through the first fraction column outlet 602A and a brine column inlet 606A of the brine column 606. The second fraction column 604 is fluidly connected to a second fraction column channel 616 through a second fraction column outlet 604A. The second fraction column channel 616 is further fluidly connected to the brine column 606 through the second fraction column outlet 604A and the brine column inlet 606A. The first fraction column outlet 602A, the second fraction column outlet 604A, and the brine column inlet 606A are disposed at a same height relative to the brine column 606. In an embodiment, the inlet and outlet of each of the first fraction column 602, second fraction column 604, and brine column 606 are shaped like a funnel, cone, or cylinder. In some embodiments, after depressurizing and before forming solid hydrate, preferably freshwater/hydrocarbon/$CO_2$, the brine and hydrate flushed water may directly move to the first fraction column 602. Later, the solid gas hydrate may be deformed (dissociated) in the hydrate crystallizer reactor 302 thereby converting the solid gas hydrate into solution such as a hydrate slurry, which may be moved to the second fraction column 604. In the second fraction column 604, the guest gas or guest/co-guest gas or mixture of gases may be split at a temperature of 25-30° C. using a heater. In an embodiment, the heater is a resistive wire heating apparatus. After the removal of the hydrate guest gas (e.g., $CO_2$) from the slurry, the low boiling point hydrocarbon-based promoters such as pentanes and the derivatives thereof may be fractionated from the freshwater within the second fraction column 604 at a temperature of 40-50° C. and pressure of about 1-1.5 bar. The hydrate gas and the low boiling point hydrocarbon promoters may be further moved to the brine column 606 to recover the gas and the promoter via the second fraction column channel 616. The promoter and the hydrate gas are further communicated with the second pump 224 for further hydrate formation process.

Figure 7:
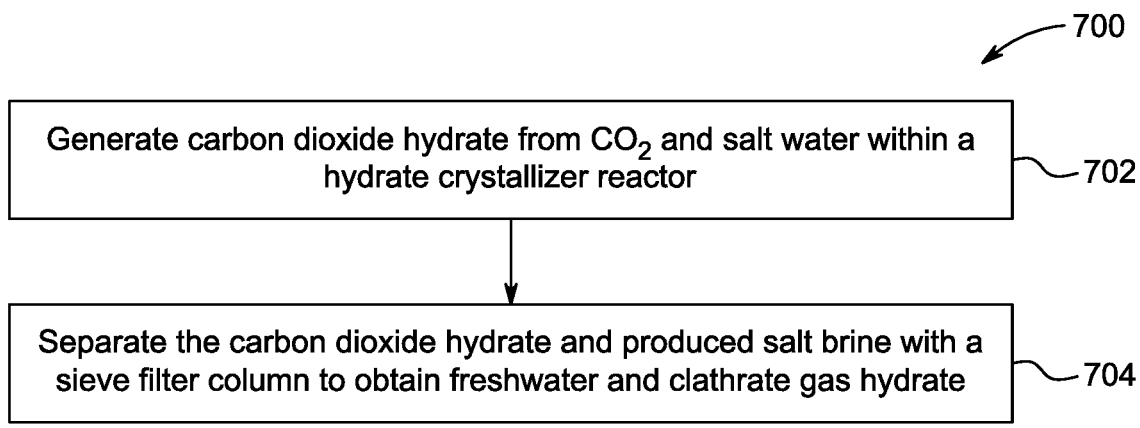
FIG. 7 is a schematic flow diagram of a gas hydrate desalination method, according to certain embodiments.

Referring to FIG. 7, a schematic flow diagram of a gas hydrate desalination method 700 is illustrated, according to an embodiment of the present disclosure. The gas hydrate desalination method 700 is alternatively referred to as 'the method 700' hereinafter. At step 702, the method 700 includes generating the carbon dioxide hydrate from $CO_2$ and the salt water within the hydrate crystallizer reactor 302 of the gas hydrate generating and conveying unit 102. The sea water stored in the liquid storage tank 202 is supplied to the hydrate crystallizer reactor 302 of the gas hydrate generating and conveying unit 102 by the first pump 206 through the bottom outlet port 204 and the feed water channel 208. The flow control valve 210 may be moved to an open position thereof to allow flow of the sea water to the hydrate crystallizer reactor 302. Further, the first pump 206 may be controlled to supply the sea water at the desired flow rate. The $CO_2$ stored in the gas feed cylinder 212 is supplied to the hydrate crystallizer reactor 302 by the second pump 224 through the gas feed assembly 214. The first pressure control valve 216 and the pressure safety valve 218 are controlled to set the gas feed pressure. Further, the second pressure control valve 220 is controlled to set the gas feed pressure at the desired pressure value before the gas is supplied to the gas hydrate generating and conveying unit 102. The desired pressure value of the feed gas may be set using the pressure gauge 222 of the gas feed assembly 214. The $CO_2$ and the salt water received within the hydrate crystallizer reactor 302 is further agitated by the magnetic stirrer 342 with the help of the magnetic plate 344, such that the carbon dioxide hydrate is generated within the hydrate crystallizer reactor 302 along with the salt brine. In some embodiments, the hydrate crystallizer reactor 302 employs the stainless-steel micromesh 346 to separate the carbon dioxide hydrate and the produced salt brine. Preferably the micromesh 346 is disposed at the apex of the parabolic bottom end 304B resting on fins of the funnel portion of an extension to a nipple in which the magnetic stirrer is disposed. The temperature within the hydrate crystallizer reactor 302 is controlled by the cooling system 108 using the detachable water jacket 320 provided around the hydrate crystallizer reactor 302. In some embodiments, the coolant stream including the ethylene glycol and water is circulated through the detachable water jacket 320 to stabilize the temperature within the hydrate crystallizer reactor 302. The data acquisition system 110 that is in communication with the thermocouples 334, the pressure sensor 336, and the lid cameras 332 records the pressure, the temperature, and the hydrate morphologies, respectively. The plurality of lid cameras 332 captures images at the pre-determined time interval and communicate with the data acquisition system 110. In some embodiments, the plurality of sieve cameras 612 disposed proximal to the sieve filter column 610 may monitor hydrate formation and dissociation in the sieve filter column 610.

At step 704, the method 700 includes separating the carbon dioxide hydrate and the produced salt brine with the sieve filter column 610 to obtain the freshwater and the clathrate gas hydrate. The carbon dioxide hydrate generated within the hydrate crystallizer reactor 302 is supplied to the gas hydrate dissociating and resolving unit 106 using the third pump 608. The sieve filter column 610 filters the brine from the has hydrate solution and fluidly communicates the brine with the second fraction column 604. Particularly, the hydrate forming fluid and at least part of the water constituent of the solid hydrate crystals are separated from the solute by the sieve filter column 610. The brine and the dissociated gas hydrate are further communicated with the first fraction column 602 and the second fraction column 604, respectively. In the second fraction column 604, the guest gas or guest/co-guest gas or mixture of gases are split at a temperature of ° C. using a heater 618. In an embodiment, the heater 618 is resistive heating wires. After the removal of the hydrate guest gas from the slurry, the low boiling point hydrocarbon-based promoters such as pentanes and the derivatives thereof are fractionated from the freshwater within the second fraction column 604 at the temperature of 40-50° C. and pressure of about 1-1.5 bar. In some embodiments, the gas is recovered in a temperature range from 20° C. to 30° C. and the hydrocarbon promoters are recovered in a temperature range from 30° C. to 50° C. The hydrate gas and the low boiling point hydrocarbon promoters are further moved to the brine column 606 to recover the gas and the promoter via the second fraction column outlet 604A, the second fraction column channel 616, and the brine column inlet 606A. The fresh water is thus separated from the hydrate gas and collected in the second fraction column 604. Further, the promoter and the hydrate gas are communicated with the second pump 224 for further hydrate formation process.

In some embodiments, the method 700 includes dissociating the gas hydrate with freshwater, which includes flushing salts and/or ions from the gas hydrate with the freshwater through the second fraction column 604. The fresh water collected in the second fraction column 604 can be used to flush the gas hydrate and/or salts/ions thereof within the second fraction column 604. The method 700 further includes transporting the salts/ions with the freshwater to the brine column 606. The mixture of the salts/ions and the fresh water is transported to the brine column 606 through the second fraction column channel 616 connected to the second fraction column outlet 604A and the brine column inlet 606A. The method 700 further includes adding the produced brine to the brine column 606 with the salts/ions and the freshwater. The brine collected in the first fraction column 602 is transported to the brine column 606 via the first fraction column channel 614 connected to the first fraction column outlet 602A and the brine column inlet 606A.

In some embodiments, the method 700 includes transporting the gas hydrate, the freshwater, the hydrocarbon promoters, and the gas to a third fraction column to further isolate the gas hydrate. The third fraction column may be further fluidly connected with the brine column 606 to collect the clathrate gas and the hydrocarbon promoters. Particularly, the method 700 includes shifting the dissociated hydrate, including pure water, highly immiscible hydrocarbon promoters, and the clathrate gas, e.g., a gas such as carbon dioxide, to the third fractionation column where the purified water, the immiscible promoter, and gas are separated, preferably individually. Within the third fractionation column, first, the gas is recovered at a temperature of 25° C., and the low boiling point hydrocarbon-based promoter is separated or recovered at a temperature of 30-50° C. from the upper portion of the third fractionation column.

Figure 8:
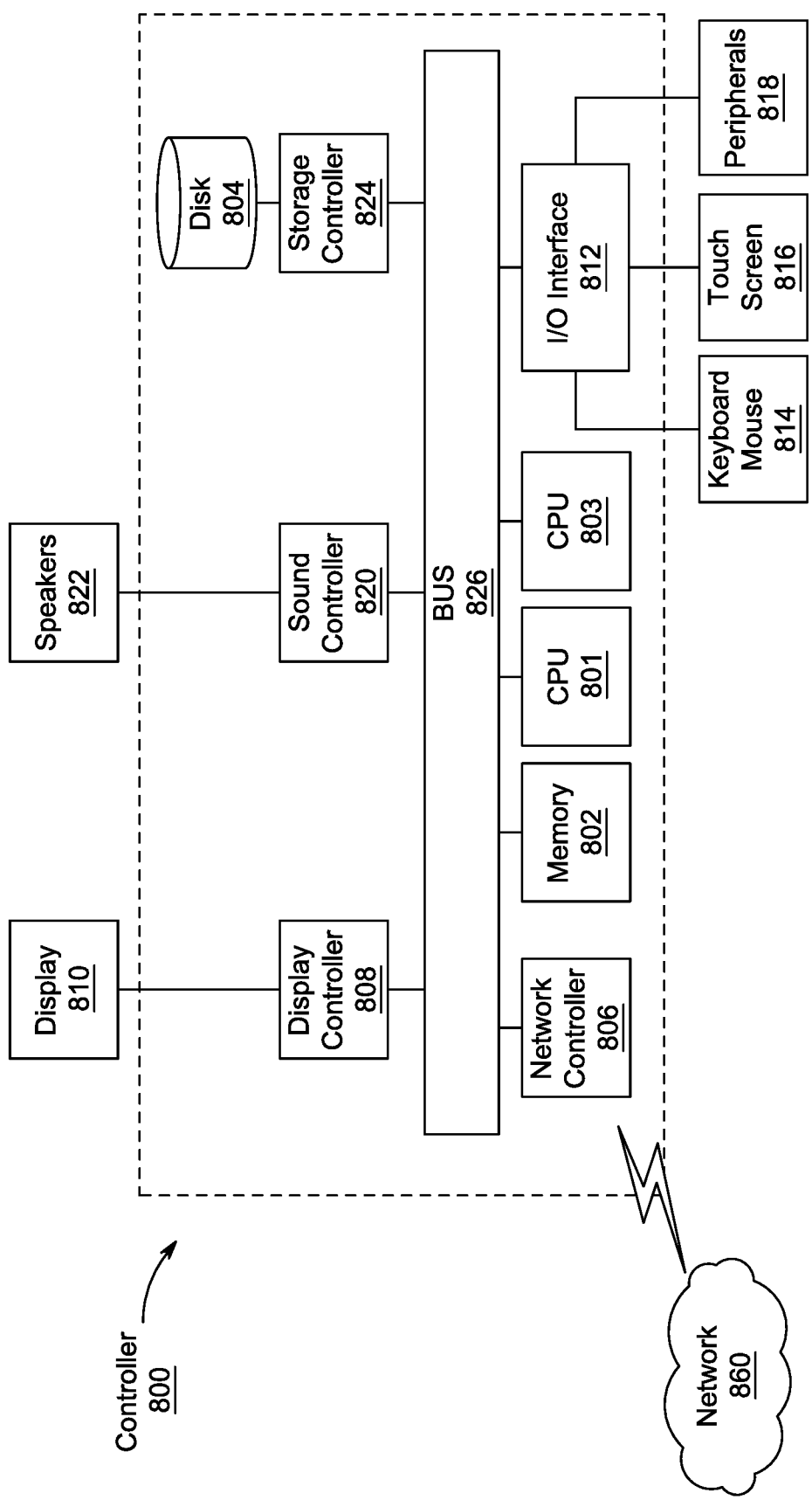
FIG. 8 is an illustration of a non-limiting example of details of computing hardware used in the data acquisition system of FIG. 5, according to certain embodiments.

Details of the hardware description of the data acquisition system 110 of FIG. 5 according to exemplary embodiments is described with reference to FIG. 8. In FIG. 8, a controller 800 is described which is representative of the controller 502 of FIG. 5 in which the controller 800 includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The controller 800 in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN sub-networks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The controller 800 further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein.

Figure 9:
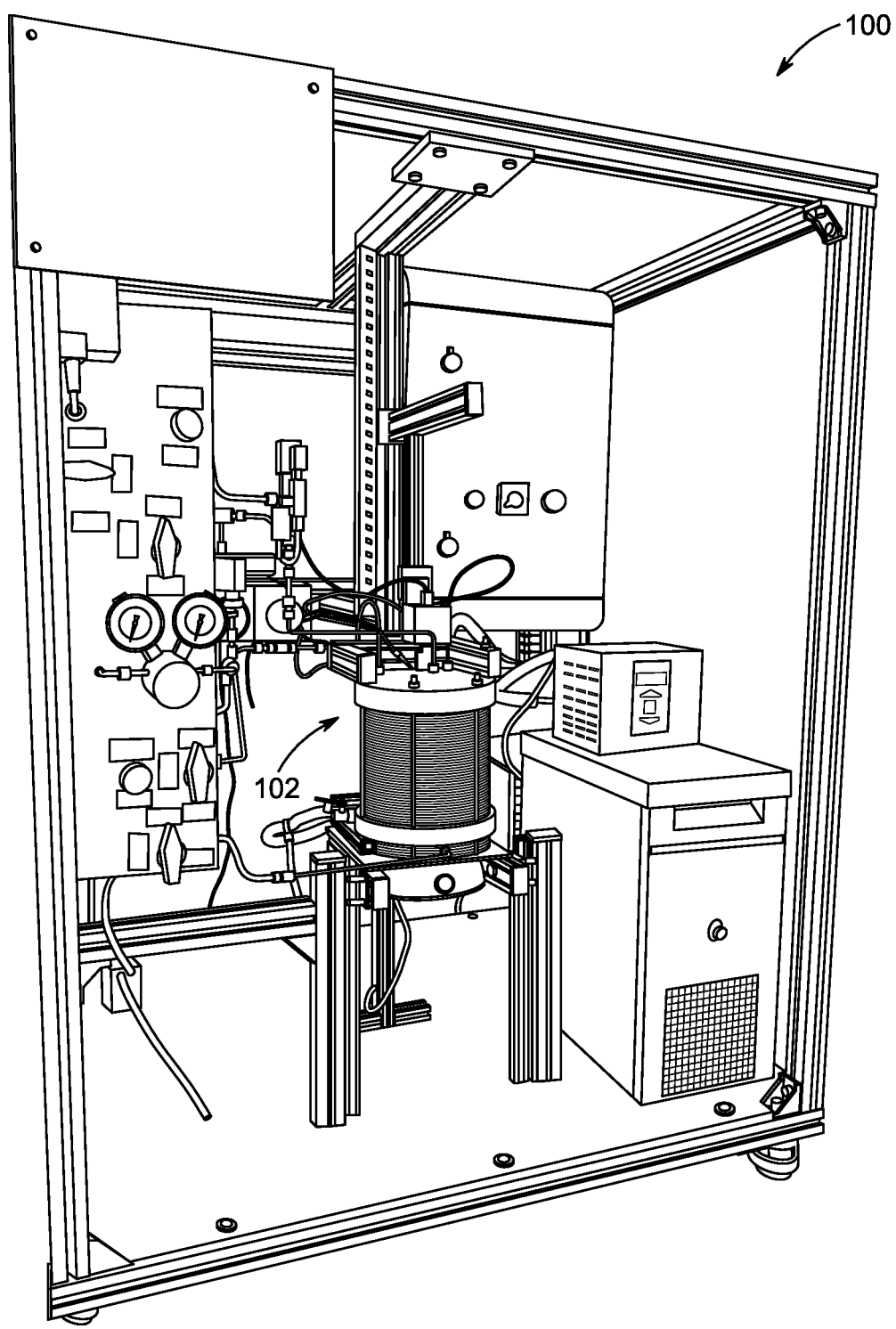
FIG. 9 is a diagrammatic illustration of the gas hydrate desalination system implemented in a lab, according to certain embodiments.

Referring to FIG. 9, a schematic diagram of the gas hydrate desalination system 100 implemented in a lab is illustrated, according to an embodiment of the present disclosure. Particularly, various hardware of the gas hydrate desalination system 100 is shown in FIG. 8. A high-pressure view cell, alternatively referred to as the hydrate crystallizer reactor 302, made from type 316-Ti stainless steel is the primary component of the gas hydrate desalination system 100. A 1000 $cm^3$ cylinder serves as a reaction chamber. Displacement of a high-pressure pump, which is later coupled to the cell's lid, allows the volume of the cell to be adjusted. The 316-Ti stainless steel hydrate crystallizer reactor has a maximum volume of 1000 $cm^3$ and a capacity of 50 $cm^3$ for liquid. A brief summary of the specifications of the hydrate crystallizer reactor 302 is provided in Table 1 and Table 2.

TABLE 1

Calculation summary of the gas hydrate desalination system

| | Design Description | | |
|---|---|---|---|
| | Calculated Minimum design | Nominal design | Nominal design |
| Shell Thickness [mm] | 7.9 | 20.0 | Adequate |
| Curved Bottom Cover Thickness [mm] | 19.3 | 20.0 | Adequate |
| Minimum corner radius | 2.97 | 2.97 | Adequate |
| Minimum corner radius | 2.97 | 35.0 | Adequate |
| Bolt Area [$mm^2$] | 183 | 348 | Adequate |
| Filter sandwich [$mm^2$] | 200 | 225 | Adequate |
| Brine discharge exit [$mm^2$] | 183 | 190 | Adequate |
| CAMERA Sight Glass Thickness [mm] | 348 | 348 | Adequate |
| LED Sight Glass Thickness [mm] | 2.3 | 2.3 | Adequate |

TABLE 2

Dimensional and design details of the gas hydrate desalination system

| Cylindrical Shell Thickness Design Data | Material | Bolting | SS304 |
|---|---|---|---|

TABLE 2-continued

Dimensional and design details of the gas hydrate desalination system

| | | | |
|---|---|---|---|
| Design Pressure, P [Mpa] | 20 | Description | M10 |
| Allowable Stress, S [Mpa] | 113 | Bolt size [mm] | 4.5 |
| Joint Efficiency, E | 1 | Bolt number [mm] | 6 |
| Corrosion Allowance, Ca [mm] | 0 | Single Bolt Area [mm$^2$] | 58 |
| Dimensions | | Allowable Stress, $S_b$ [Mpa] | 646 |
| Inner Diameter, [mm] | 80 | Allowable Stress, $S_o$ [Mpa] | 872.1 |
| Inner Radius [mm] | 40 | Bolt root area $A_b$ [mm$^2$] | 348 |
| Inner Length [mm] | 200 | Gasket width [mm] | 4 |
| Minimum Thickness,UG-27(c)(1) [mm] | 7.920792 | $b_o$ | 2 |
| Bottom Cover Thickness | | m | 0 |
| Outer Diameter [mm] | 120 | y | 0 |
| Bolt circle [mm] | 100 | Effective gasket seating width, b | 2 |
| D [mm] | 80 | $h_G$ | 7.5 |
| Bolt load in operating condition | 118833.3 | $h_D$ | 11 |
| Minimum thickness, t [mm] | 19.33405 | $h_r$ | 7.5 |
| Minimum corner radius | 2.970297 | $H_p$ | 0 |
| Top Bolted Cover Thickness | | H | 118833.3 |
| Flange OD, A [mm] | 120 | $H_D$ | 100480 |
| Flange ID, B [mm] | 80 | $H_r$ | 18353.3 |
| Bolt Circle, C [mm] | 102 | $W_{m1}$ | 118833.3 |
| Flange thickness, t [mm] | 20 | $W_{m2}$ | 0 |
| Gasket width, N | 4 | $Am_1$ [mm$^2$] | 183.9525 |
| Gasket Id, [mm] | 91 | $Am_2$ [mm$^2$] | 0 |
| Gasket Od, [mm] | 83 | Bolt Area Sufficient, $A_b > A_m$? | Pass |
| K = A/B | 1.5 | Total Work | 231957.9 |
| G [mm] | 87 | | |
| Cover Thickness | | | |
| Outer Diameter | 120 | Gasket width, N | 5 |
| Bolt circle | 100 | bo | 5 |
| Gasket | 87 | d | 87 |
| Hg | 6.5 | Bolt load in operating condition | 231957.9 |
| Gasket material | Rubber | Minimum thickness, t [mm] | 26.33033 |

The sapphire glass lenses 330 allow for a clearer view of the interface between the gas and the liquid contents, which is useful for capturing detailed photographs of the hydrate formation process. The autoclave reactor has a temperature range of 10° C. to 90° C., preferably from 25° C. to 75° C., or 50° C., and a pressure range of 0-200 bar, preferably from 25-175 bar, preferably from bar, preferably from 75-125 bar, or 100 bar. The reactor thermocouples have an accuracy of 0.1° C. The gas pressure in the hydrate crystallizer reactor 302 is measured by the pressure sensor 336 using a Rosemount smart pressure transducer (model 3051S) with the precision of ±bar. Antifreeze solution of 50% ethylene glycol and 50% distilled water is selected as the coolant, and the temperature of the hydrate crystallizer reactor 302 experiment is controlled by a water bath with the regulating precision of 0.01° C. The hydrate crystallizer reactor 302 has a filter and a freshwater recovery route at the bottom 304B, and it also has two sapphire glass lenses 330 so that scientists can watch the hydrates form. The gas inlet/outlet channel 314 was also added to the detachable lid 310 of the hydrate crystallizer reactor 302. Four T-type thermocouples 334 were inserted into the hydrate crystallizer reactor 302 for continuous and simultaneous measurement of liquid temperature and gas temperature inside the hydrate crystallizer reactor 302.

Continuous cyclic recording of pressure, temperature, and hydration pictures is possible at user-specified intervals. Pressure and temperature readings are being recorded using the data acquisition system 110. The hydrate morphology can also be recorded with the use of an adjustable full HD camera that is built into the recording program. The hydrate inside the hydrate crystallizer reactor 302 was agitated by placing the multi-speed magnetic stirrer 342 at the very base of the hydrate crystallizer reactor 302.

According to the present disclosure, a filter-based real image gas hydrate, experimental apparatus and process for the separation of fresh water from saline water or wastewater are illustrated. Using low pressure and moderate subcooling based gas hydrate in a hydrate fractionation column, a brine or concentrate is separated from the lower portion of the hydrate crystallizer reactor 302, and later purified water is extracted from an upper portion of the hydrate depressurized region of the hydrate crystallizer reactor 302. The brine is shifted into a storage column before dissociating the lower pressure and temperature gas hydrate. Prior to dissociation, the lower pressure gas hydrate salts ions is flushed with purified water, then flushed water is passed through the sieve filter column 610 via the third pump 608, then shifted to the brine column 606. Later, within the hydrate crystallizer reactor 302, the dissociation drives via a low stirring system that enhances the rate at which hydrate rises into the hydrate dissociation region.

Calibrations

Measurements of PvT on gas hydrates or the phase behavior of the fluids generating hydrates can be made using the gas hydrate desalination system 100 of the present disclosure. In order to calculate the starting quantities of gas from temperature and pressure readings, it was necessary to know the total volume of the cell, fitting, and relief line. This value was determined by re-pressurizing a previously evacuated system to a constant pressure of 5 bar and then filling it with degassed and deionized water at a thermostatic temperature of 25° C. using a liquid metering pump. Both the water+the hydrate crystallizer reactor 302 (including the magnetic stirrer 342)+tubing assembly were weighed before and after each injection. At 25° C. and 5 bar of pressure, the mass of the amount of water needed to fill the device was calculated. Density of water may be used to calculate the exact volume inside based on the mass. Liquid water density was reported with a relative uncertainty of 0.001 percent. Both the pressure transducer and the relief valve were calibrated independently. At zero, half, and full volume compression settings, the gas hydrate desalination system 100 was calibrated thrice.

Gas Hydrate Based Desalination Experimental Procedure

Processes for hydrate formation and dissociations vary greatly depending on the type of system being studied. In the present disclosure, two distinct methods of applications are illustrated. The hydrate crystallizer reactor 302 is emptied, and then carbon dioxide gas is introduced at 25° C. In order to let the gas hydrate desalination system 100 establish equilibrium, it was allowed to run its course. The volume, pressure, and temperature measurements were taken after this interval. With this information, the precise amount of $CO_2$ injected into the hydrate crystallizer reactor 302 may be determined, given the compressibility factor and the T-P condition. A portion of the laden gas was sub-cooled by cooling the gas hydrate desalination system 100 to 5° C. It is important to note that the fraction of the gas being cooled may be calculated if one knows the molar volume of both the liquid and gas phases. A last step is injecting water into the $CO_2$ cooling using the metering liquid pump at a rate of 0.5 mL/min. At a pressure of 40 bar, close to the $CO_2$ vapor pressure at 5° C., the injection was halted. It can be hypothesized that after the maximum amount of hydrate is generated, pressure would begin to rise. After that point, liquid $CO_2$ cannot react with the injected water. After that time, the hydrate will dissociate due to the injected water. This indicates that an equal volume of gas is liquefied to compensate for the liquid absorbed during hydrate formation. When all the $CO_2$ is turned into a liquid, the hydrate will stop growing and the liquid level will drop until it disappears under constant pressure. And if that's the case, adding water through injection won't do anything but raise pressure further. Accordingly, when the pressure was raised, water was injected again while increasing the cell's volume to its maximum and maintaining a pressure of 40 bar. The gas hydrate desalination system 100 was then allowed to disperse the hydrates on its own. To determine the precise volume of water injected, the gas hydrate desalination system 100 was weighed before and after each administration.

According to the present disclosure, the gas hydrate desalination system 100 and the method 700 are developed and performed based on bench scale reactor for commercial applications. The parabolic design of the hydrate crystallizer reactor 302, particularly, the detachable lid 310 has the capabilities to accommodate the sapphire glass lenses 330, the plurality of lid cameras 332, and the plurality of thermocouples 334. Further, the parabolic bottom end of the hydrate crystallizer reactor 302 provides gentle vortex which helps the gases to be dissolved in liquids faster, or rapid mass transfer among the reactor components may overcome the issue of delayed induction time which is generally observed in the known system. Moreover, the parabolic bottom end also helps in stable magnetic stirrer, and rapid discharge of the brine and the hydrate fluid from the hydrate crystallizer reactor 302. The hydrate crystallizer reactor 302 does not require to be opened periodically as separate components intake system such as the gas-liquid supplying and mixing unit 104 is provided. The brine and the hydrate fluid discharge can be performed with or without the third pump 608. The detachable jacket cooling system may provide precise temperature differences between the chilled water and hydrate exothermic reaction during the hydrate formation. A separate continuous separation system, such as the gas hydrate dissociating and resolving unit 106, provides an essay hydrate crystals and freshwater recovery. The separation system can accommodate a series of hydrate formation batch reactor. Particularly, two or more hydrate batch reactor may be used. In some embodiments, the gas hydrate desalination system 100 may include a series of batch reactors in a range of 2 reactors to 8 reactors.

One objective of the present disclosure is to provide a system that is versatile and allows for the determination of phase equilibria and hydrate phase properties as well as the assessment of the kinetics of the hydrate formation and destabilization processes. The gas hydrate desalination system 100 was built to meet the standards including, but not limited to, (a) it should be possible to do investigation on thermogenic-like gases in the gas, liquid, or supercritical phase, and to discover whether or not they contain acid gases, water, brine, and carbon dioxide, (b) hydrate production and dissociation processes should be observable with or without sediment, (c) understanding the shape and location of gas hydrates within a cell requires visualization, (d) custom-made sensors can be incorporated to investigate unique features of the gas hydrate, (e) it is important that analytical tools can be linked together, and (f) both the tropics and the polar areas should fall within the temperature and pressure range, which should account for the vast majority of operations involving gas hydrates. The features such as windows allow for visual observation and videography. The gas hydrate desalination system 100 has the capacity to conduct static and dynamic experiments at pressures up to 200 bar. Moreover, the gas hydrate desalination system 100 is designed to work at pressures of up to 250 bars and can be installed with minimal effort using analytical instruments and/or bespoke sensors. As a result, certain hydrate properties can be studied without requiring extensive equipment adjustments.

Numerous modifications and variations of the present disclosure are possible in light of the above teachings. It is therefore to be understood that within the scope of the appended claims, the invention may be practiced otherwise than as specifically described herein.

The invention claimed is:

1. A gas hydrate desalination system, comprising:
  a gas hydrate generating and conveying unit;
  a gas-liquid supplying and mixing unit; and
  a gas hydrate dissociating and resolving unit;
  wherein the gas hydrate generating and conveying unit includes:
    a hydrate crystallizer reactor with a detachable water jacket surrounding portion of the hydrate crystallizer reactor and a plurality of thermocouples disposed within the hydrate crystallizer reactor;
    a detachable lid of the hydrate crystallizer reactor having a liquid inlet and a gas inlet;
    at least two sapphire glass lenses disposed on an outer surface of the detachable lid;
    a pressure sensor disposed inside the hydrate crystallizer reactor;
    a plurality of lid cameras disposed outside the hydrate crystallizer reactor proximal to the sapphire glass lenses;
    an exit concentrate channel at a bottom of the hydrate crystallizer reactor that has a length in a longest dimension of from 0.6 to 0.8 times a length of the hydrate crystallizer reactor; and
    heat transfer tubes configured to cool hydrate crystals formed in the hydrate crystallizer reactor;

wherein the gas-liquid supplying and mixing unit includes:
a liquid storage tank fluidly connected to a first pump that is fluidly connected to the hydrate crystallizer reactor through the liquid inlet; and
a gas feed cylinder fluidly connected to a second pump that is fluidly connected to the hydrate crystallizer reactor through the gas inlet;
wherein the gas hydrate dissociating and resolving unit includes:
a third pump fluidly connected to the exit concentrate channel, a second fraction column, and a sieve filter column;
the sieve filter column is fluidly connected to a first fraction column through a sieve filter outlet;
the first fraction column is fluidly connected to a first fraction column channel through a first fraction column outlet and the first fraction column channel is fluidly connected to a brine column through the first fraction column outlet;
the second fraction column is fluidly connected to a second fraction column channel through a second fraction column outlet and the second fraction column channel is fluidly connected to the brine column through the second fraction column outlet; and
the first fraction column outlet, the second fraction column outlet, and a brine column inlet are disposed at a same height relative to the brine column.

2. The system of claim 1, further comprising:
a data acquisition system that records pressure, temperature, and hydrate morphologies measurements from the hydrate crystallizer reactor; and
the data acquisition system is configured to monitor one or more flow rates from the gas feed cylinder and the liquid storage tank and record a pressure from the sieve filter column.

3. The system of claim 2, wherein the data acquisition system captures hydrate morphology data with the plurality of lid cameras; and
the plurality of thermocouples comprises at least four reactor thermocouples disposed inside the hydrate crystallizer reactor, at least four liquid thermocouples disposed inside the hydrate crystallizer reactor, and at least three gas thermocouples disposed inside the hydrate crystallizer reactor.

4. The system of claim 1, wherein the hydrate crystallizer reactor has an internal total volume of between 500 $cm^3$ and 1500 $cm^3$, and the reactor comprises an extension housing a magnetic stirrer; wherein the extension is connected to the bottom of the reactor; wherein the bottom of the reactor has a parabolic shape and the extension connects to the bottom of the reactor via a connecting portion having a top edge connected to the bottom of the reactor and a bottom edge connected to the extension; wherein the connecting portion has a funnel shape with a top large diameter connected to the bottom of the reactor and bottom small diameter connected to the extension and a plurality of fins disposed therein.

5. The system of claim 1, wherein the hydrate crystallizer reactor if configured to operate with a liquid volume of between 10 $cm^3$ and 100 $cm^3$.

6. The system of claim 1, wherein the hydrate crystallizer reactor is fabricated of 316 titanium stainless steel.

7. The system of claim 1, wherein the hydrate crystallizer reactor comprises a stainless-steel micromesh to separate a carbon dioxide hydrate and salt brine.

8. The system of claim 1, wherein the hydrate crystallizer reactor further comprises a magnetic plate disposed at the bottom of the hydrate crystallizer reactor.

9. The system of claim 1, wherein the detachable lid is substantially parabolic.

10. The system of claim 1, wherein the bottom of the hydrate crystallizer reactor is substantially parabolic as to promote rapid discharge of a produced salt brine.

11. The system of claim 1, wherein the hydrate crystallizer reactor is a batch reactor.

12. The system of claim 11, wherein the system comprises 2-8 batch reactors arranged in series.

13. A desalination method, comprising:
generating a gas hydrate from $CO_2$ and saltwater within the hydrate crystallizer reactor of the system of claim 1; and
separating the gas hydrate and produced salt brine with the sieve filter column.

14. The method of claim 13, wherein the separating is conducted with a stainless-steel micromesh; and
a plurality of sieve cameras is disposed proximal to the sieve filter column to monitor gas hydrate formation and dissociation in the sieve filter column.

15. The method of claim 13, further comprising:
dissociating be gas hydrate with freshwater to form gas hydrate salts;
flushing the gas hydrate salts with the freshwater through the second fraction column;
transporting the gas hydrate salts with the freshwater to the brine column; and
adding the produced brine to the brine column with the gas hydrate salts and the freshwater.

16. The method of claim 13, wherein the method further comprises transporting the gas hydrate, freshwater, hydrocarbon promoters, and a gas to a third fraction column to further isolate the gas hydrate.

17. The method of claim 16, wherein the gas is a mixture of carbon dioxide and an inert gas.

18. The method of claim 16, wherein the gas is recovered in a temperature range from 20° C. to 30° C.; and
one or more hydrocarbon promoters are recovered in a temperature range from 30° C. to 50° C.

19. The method of claim 13, wherein a coolant stream comprising ethylene glycol and water is circulated through the detachable water jacket to stabilize a temperature within the hydrate crystallizer reactor.

20. The method of claim 13, wherein the plurality of lid cameras captures images at a pre-determined time interval; and
the hydrate gas is recycled to the second pump.

* * * * *